United States Patent [19]

Alive et al.

[11] Patent Number: 5,795,555
[45] Date of Patent: Aug. 18, 1998

[54] MICRO-MESO POROUS AMORPHOUS TITANIUM SILICATES AND A PROCESS FOR PREPARING THE SAME

[76] Inventors: Keshavaraja Alive; Ramaswamy Vedanayaki; Ramaswamy Arumugamangalam Venkataraman; Ratnasamy Paul, all of National Chemical Laboratory, Pune-411008, Maharashtra, India

[21] Appl. No.: 510,574

[22] Filed: Aug. 2, 1995

[30] Foreign Application Priority Data

Nov. 24, 1994 [IN] India ............................ 1508/94

[51] Int. Cl.$^6$ ............................................. C01B 33/20
[52] U.S. Cl. .................................... 423/326; 423/598
[58] Field of Search ................................... 423/326, 598

[56] References Cited

U.S. PATENT DOCUMENTS

| | | | |
|---|---|---|---|
| 4,006,175 | 2/1977 | Termin et al. . | |
| 4,021,454 | 5/1977 | Wulff et al. . | |
| 4,367,342 | 1/1983 | Wulff et al. | 549/529 |
| 4,410,501 | 10/1983 | Taramasso et al. | 423/326 |
| 4,567,030 | 1/1986 | Yuaso et al. | 423/326 |
| 4,968,842 | 11/1990 | Padovan et al. | 564/253 |
| 5,053,139 | 10/1991 | Dodwell et al. | 210/688 |
| 5,277,931 | 1/1994 | Maglio et al. | 427/212 |

FOREIGN PATENT DOCUMENTS 1249079  10/1971  United Kingdom .

OTHER PUBLICATIONS

Tanev et al. "Titanium Containing Mesoporous Molecular Sieves For Catalytic Oxidation of Aromatic Compounds" *Nature* vol. 368 pp. 321–323 Mar. 1994.

Ratnasamy, P. and A.J. Leonard. "X–Ray Scattering Techniques in the Study of Amorphous Catalysts" *Catalysis Reviews* 6(2): 293–322 (1972) (No Month).

Romano, et al. "Selective oxidation with Ti–silicalite" *La Chimica & L'Industria* 72: 610–616 (1990) (No Month).

Kooyman, et al. "Titanium deposited from $TiCl_4$ on amorphous silica and silicalite–1 as catalyst in aromatic hydroxylation reactions" *Catalysis Letters* 13: 229–238 (1992) (No Month).

*Primary Examiner*—Mark L. Bell
*Assistant Examiner*—Louis M. Troilo
*Attorney, Agent, or Firm*—Foley, Hoag & Eliot LLP

[57] ABSTRACT

A novel micro-meso porous amorphous titanium silicates having a molar composition in terms of the anhydrous oxides of $TiO_2$:(5-400) $SiO_2$, the said titanium silicates being further characterised by (a) the absence of any line corresponding to individual oxides of titanium and silicon in its x-ray diffraction pattern, (b) the presence of interatomic vectors around 1.6–1.7, 2.7–2.8, 4.1–4.2 and 5.0–5.2 Å in the radial electron density distribution, (c) an absorption band around 220 nm in the ultraviolet region corresponding to tetrahedral Si—O—Ti linkage, (d) an absorption band around 960 cm$^{-1}$ in infrared region corresponding to tetrahedral Si—O—Ti linkage and (e) a bimodal pore size distribution with the first peak width maximum at a value less than 10 Å and the second peak width maximum between 10 and 100 Å, respectively; and a process of preparing said micro-meso porous amorphous titanium silicates wihout any nitrogenated organic base and at a neutral pH of around 7.

4 Claims, 2 Drawing Sheets

MICRO-MESO POROUS AMORPHOUS TITANIUM SILICATES AND A PROCESS FOR PREPARING THE SAME

This invention relates to a process for the preparation of micro-meso porous amorphous titanium silicates. More particularly, it relates to novel micro-meso porous titanium silicates posssessing catalytic properties and a method for their preparation.

Titanium silicates, useful as catalysts in many oxidation reactions can be broadly classified into 2 categories, based on their structure, namely (1) amorphous and (2) crystalline titanium silicates. GB patent 1, 249, 079 to Shell Oil describes a representative of the amorphous titanium silicate, the said material being obtained by the reaction of a compound of titanium with solid silica of high surface area, followed by transformation of the titanium compound into the oxide. Description of crystalline titanium silicates are given in, for example, U.S. Pat. No. 4,410,501 and GB 2, 116, 974 which describe the preparation of TS-1, a representative of this class of titanium silicates. Both amorphous and crystalline titanium silicates have been used as catalysts in selective oxidation of hydrocarbons and their derivatives in the prior art. The amorphous titanium silicates are known in the prior art to catalyse oxidation of hydrocarbons or their derivatives using organic hydroperoxides as the oxidising agents. The above mentioned patent GB 1, 249, 079, for example, describes the use of an amorphous titanium silicate as a catalyst to epoxidise propylene to propylene oxide using organic hydroperoxides such as tertiary butyl hydroperoxide or ethylbenzene hydroperoxide as the oxidising agents. On the other hand, crystalline titanium silicates such as TS-1, are known to catalyse the oxidation of hydrocarbons or their derivatives, when $H_2O_2$ rather than organic hydroperoxides are used as catalysts. The report of U. Romono et al. in La Chimica and L'Industria, Vol. 72 (1990) p. 610 describes the application of crystalline titanium silicates, like TS-1, in selective oxidation processes.

Both the amorphous and crystalline titanium silicates of the prior art have certain drawbacks. One drawback of the amorphous material is that they possess high activity and selectivity in the oxidation process only when organic hydroperoxides are used as oxidising agents. When other more convenient oxidising agents i.e. like hydrogen peroxide is used the activity and selectivity are lower. P. J. Kooyman (Catalysis Letters, Vol. 13 (1992), p. 229–230) studied the oxidation of phenol over an amorphous titanium silicate using $H_2O_2$ as the oxidising agent but found only a low selectivity towards the hydroxylation products at high conversion levels of the phenol. One drawback of oxidising agents like organic hydroperoxides (for ex. tertiary butyl hydroperoxide, cumenehydroperoxide, benzyol hydroperoxide) is the production of stoichiometric quantities of byproducts. For example, in the oxidation of propylene to propylene oxide using organic hydroperoxides, for every ton of propylene oxide, 2.7 tons of methylphenyl carbinol or 3 tons of tertiary butyl alcohol are coproduced whose disposal poses special problems. When $H_2O_2$ is used as the oxidising agent, water is the only coproduct.

One drawback of prior art crystalline titanium silicates, like TS-1, is that while they are highly active and selective in catalytic reactions involving small molecules, they are inactive when the dimensions of the reactant molecules are larger than the pore size of the crystalline titanium silicates thereby excluding the reactants from access to the internal pores of the crystalline material wherein practically all the active sites needed for the catalytic conversion are located.

Many of the oxidation processes in the fine chemicals industry involve the selective oxidations of bulky hydrocarbons or their derivatives.

It would, hence, be desirable to develop titanium silicates which possess the advantageous featues of both the amorphous and crystalline titanium silicates. Such a material would, ideally, possess (1) a bimodal pore size distribution with one characteristic pore width in the region of micropores, namely less than 10 Å and a second characteristic pore width in the region of mesopores, namely between 10 and 100 Å, thereby enabling the oxidation of bulky organic molecules like prior art amorphous titanosilicate catalysts and (2) contain the titanium ions in a structural environment similar to that prevalent in crystalline titanium silicate, TS-1, so that oxidation of hydrocarbons can be accomplished using the more convenient hydrogen peroxide rather than organic hydroperoxides as the oxidsing agents.

The present invention relates to a novel family of stable synthetic micro-meso porous amorphous titanosilicates, identified as MMATS, and possessing specific characteristic which distinguish them from other titanosilicates of prior art.

The MMATS according to the invention are prepared by reacting the alkoxides of titanium like titanium ethoxide, titanium butoxide or titanium isopropoxide and an alkoxide of silicon viz. tetraethylorthosilicate in the absence of any nitrogenated organic bases such as tetramethyl ammonium hydroxide, tetraethyl hydrogen peroxide, tetrapropyl ammonium hydroxide or tetrabutyl ammonium hydroxide, at a neutral pH at a temperature below about 90° C., getting the resulting solid material from the reaction mixture due to gelation of the sol, drying in a oven at a temperature ranging from 90° to 120° C. and further calcining the dried material at a temperature between 300° to 600° C.

Broadly speaking, according to the present invention, there is provided an amorphous titanium silicate product having the following composition in terms of mole ratios of oxides in the anhydrous state of $TiO_2:(5-400)$ $SiO_2$.

In accordance with a preferred embodiment of the invention such titanosilicates are characterised by the following distinctive features, the presence of all of them being essential in the material of the present invention.

1. a chemical composition, in terms of the mole ratios of the anhydrous oxides of $TiO_2:(5-400)$ $SiO_2$.
2. absence of any line in the x-ray diffraction pattern,
3. presence of an absorption band around 220 nanometers in the ultraviolet region of the absorption spectrum,
4. presence of a sharp absorption band around 960 $cm^{-1}$ in the infrared region of the absorption spectrum,
5. a bimodal pore size distribution with one characteristic pore width at a value less than 10 Å and a second characteristic pore width between 10 and 100 Å, and
6. the presence of interatomic vectors around 1.6–1.7, 2.7–2.8, 3.2–3.3, 4.1–4.2 and 5.0–5.2 Å in the radial electron density distribution.

The present invention also relates to a method for preparing the synthetic titanium silicates with six distinctive features described hereinabove i.e. a micro-meso porous amorphous titanium silicates having a molar composition in terms of the anhydrous oxides of $TiO_2:(5-400)$ $SiO_2$ and also comprising the following further characteristics namely (a) the absence of any line corresponding to individual oxides of titanium and silicon in its x-ray diffraction pattern, (b) the presence of interatomic vectors around 1.6–1.7, 2.7–2.8, 4.1–4.2 and 5.0–5.2 Å in the radial electron density distribution, (c) an absorption band around 220 nm in the ultraviolet region corresponding to tetrahedral Si—O—Ti linkage,(d) an absorption band around 960 cm$^{-1}$ in infrared region corresponding to tetrahedral Si—O—Ti linkage and (e) a bimodal pore size distribution with the first peak width maximum at a value less than 10 Å and the second peak width maximum between 10 and 100 Å, respectively.

While one or more of the six above mentioned features may be present in the prior art titanosilicates, the presence of all the six features is a unique and distinguishing characteristic of the material of the present invention. Thus, while prior art amorphous titanium silicates may possess the features 1,2 and sometimes even feature 5 mentioned hereinabove, they do not possess the remaining features, 3,4 and 6. Similarly, while prior art cyrstalline titanium silicates may exhibit features 1,3,4 and 6, they do not definitely possess features 2 and 5. To the applicants' knowledge, no single material is known in the prior art, which possesses simultaneously all of the above mentioned six features.

The synthetic material according to the present invention has characteristics which are demonstrated by standard techniques well know to those skilled in the art such as X-ray diffraction, IR spectroscopy, UV-Visible, X-ray Scattering and also catalytic test reactions. The chemical composition may be ascertained by conventional wet chemical methods. The absence of any line in the x-ray diffraction pattern, feature number 2, mentioned hereinabove, may be verified by a conventional powder diffractometer provided with an electronic pulse counting system.

Features 3 and 4 may be identified using conventional ultraviolet and infrared spectrometers, respectively. The bimodal pore size distribution, feature 5 spectrometers, respectively. The bimodal pore size distribution, feature 5 may be evaluated from an absorption-desorption isotherm obtained using argon gas as the adsorbate in a conventional adsorption apparatus. The principles, apparatus and calculations involved in obtaining the interatomic vectors from the radial electron density distribution in amorphous materials is described in detail in chapter 12 of the text book titled "X-ray diffraction procedures for polycrystalline and amorphous materials" by H. P. Klug and L. E. Alexander, Second Edition 1974, published by Wiley Inc., N.Y. Further, additional information of particular relevance to the present invention is described in the review article titled "X-ray scattering techniques in the study of amorphous catalysts" by P. Ratnaswamy and A. J. Leonard in Catalysis Reviews, Vol. 6, p. 292 (1972) published by Marcel Dekker Inc. it may be mentioned here that while peaks in the x-ray diffraction pattern characterise crystalline material, peaks in the radial electron density distribution characterise and serve as a "finger print" for amorphous material which lack a long-range order characteristic of crystalline material. The radial distribution specifies the density of atoms or electrons as a function of the radial distance from any reference atom or electron in the system. The peaks in such a distribution correspond to interatomic vectors between atoms present in the material.

Figure 1:
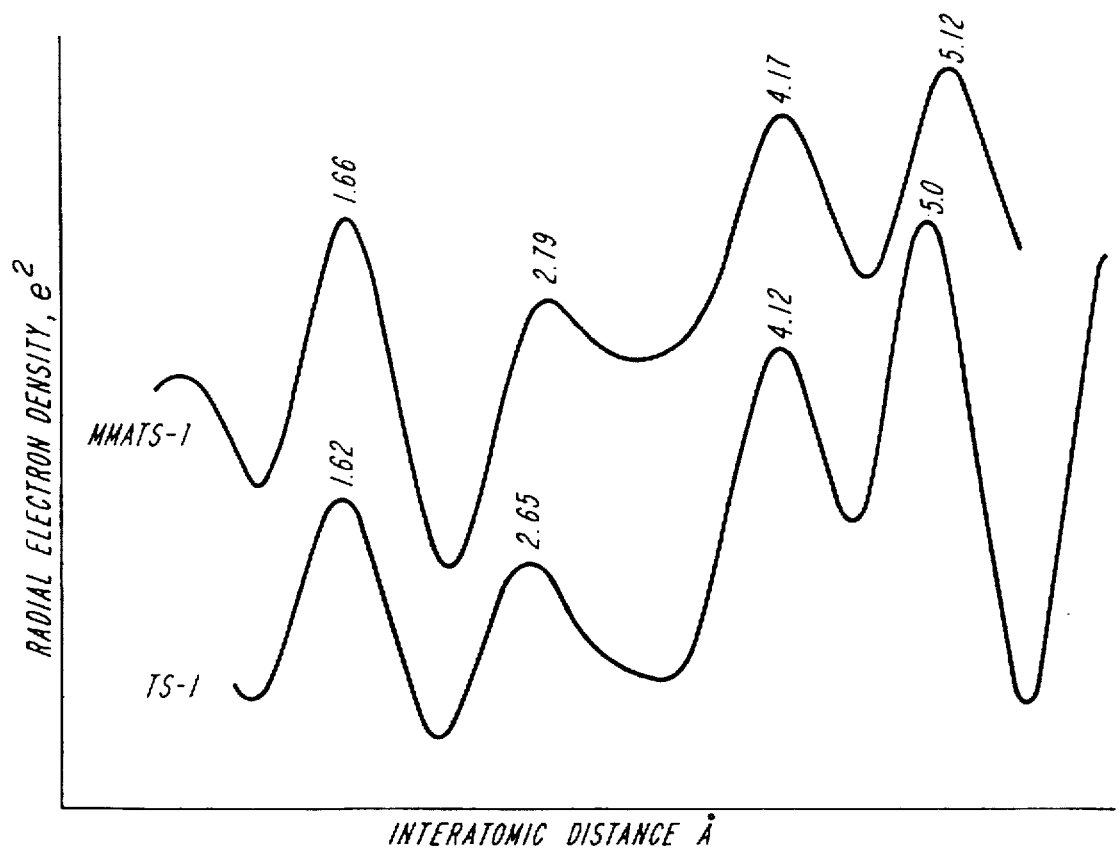
FIG. 1 is a graphical representation of the radial electron density distribution for a crystalline titano-silicate, TS-1 and for a micro-meso porous amorphous titanium silicate, MMATS-1.

For crystalline materials, such information may be readily obtained from the x-ray diffraction pattern by conventional procedures. For amorphous materials, lacking any peaks in the x-ray diffraction pattern, the radial electron density distribution is conventionally utilised to obtain the interatomic vectors. The radial electron density distribution of the material of this invention is illustrated in FIG. 1 of the drawings accompanying this specification wherein MMATS-1 corresponds to an amorphous the pattern of a sample of crystalline titano-silicates (TS-1) of chemical composition, $TiO_2$:32 $SiO_2$ is also included in FIG. 1. The peaks at 1.6–1.7, 2.7–2.8, 4.1–4.2 and 5.0–5.2 Å correspond to interatomic distance vectors, Si—$O_1$, $O_1$—$O_2$, $Si_1$—$Si_2$ (Ti), $Si_1$—$O_2$ ($O_1$—$O_2$) and $Si_1$—$Si_3$ ($O_1$—$O_3$), respectively.

Figure 2:
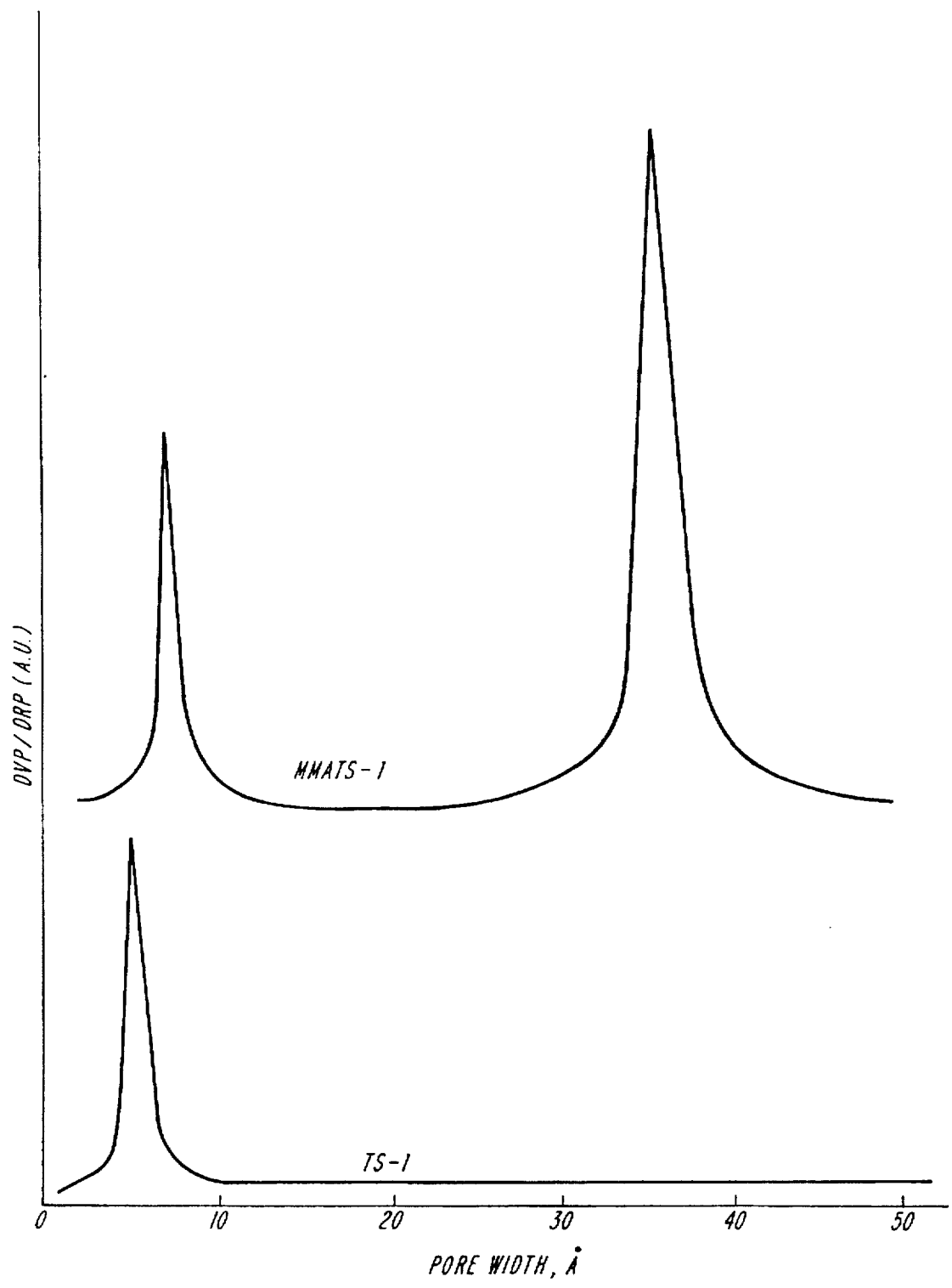
FIG. 2 is a graphical comparison of the pore size distribution of a crystalline titano-silicate, TS-1 with the pore size distribution of a micro-meso porous amorphous titanium silicate, MMATS-1.

FIG. 2 of the drawings accompanying this specification compares the pore size distribution of the hitherto known crystalline titanosilicate (TS-1) and that of the MMATS (with Si/Ti=34) sample prepared according to the process of the present invention. This is obtained by the nitrogen adsorption-desorption method by using omnisorp 100 CX (Omicron, USA) apparatus. The surprising and illuminating information from FIG. 2 of the drawings accompanying this specification is that even though the MMATS material is (1) amorphous, (2) possess a bimodal pore size distribution including meso pores in the range 10–100 Å and (3) were synthesised at a pH=7 in the absence of any nitrogenated organic base at low temperatures and atmospheric pressure.

The immediate environment of Si and Ti atoms in MMATS, as revealed by the position of the interatomic vectors, which is represented in FIGS. 1 and 2 of the drawings accompanying this specification, is surprisingly similar to that prevailing in TS-1 which is (1) crystalline with a well defined x-ray diffraction pattern, (2) possesses a single value of the pore width of around 5.5 Å and no pores with width in the meso pore range above 10 Å and (3) which can be synthesised only at a pH above 10 in the presence of a nitrogenated organic base as described in U.S. Pat. No. 4,410,501. This similarity can be ascribed to the fact that the present preparation method avoids the crystalization of individual oxides of titanium and silicon.

The MMATS material of the present invention can be advantageously used

The MMATS material of the present invention can be advantageously used particularly in the following selective oxidation reactions:

1. Benzene to phenol
2. Toluene to cresols
3. Xylene to xylenols
4. Napthalene to napthols
5. Anthracene to hydroxy anthracenes
6. N-alkanes to n-alkanols
7. Cyclohexane to cyclohexanol
8. Propylene to propylene oxide
9. Styrene to styrene oxide
10. Phenol to hydroquinone and catechol
11. Allyl alcohol to glycidol While the origin of the catalytic activity of the amorphous titanium silicates in hydrocarbon oxidation processes is not clear, it may be speculated that the presence of isolated, tetravalent titanium ions in tetrahedral coordination positions as indicated by the absorption band at 220 nm and the interatomic vector at 3.23 Å in the radial electron density distribution may cause the selective oxidation of Hydrocarbons. B. Notari in "Innovation in Zeolite Materials Science" (Studies in Surface Science and Catalysis, Vol. 37, P. J. Grobet et al. Editors, Pub. Elsevier, Amsterdam, 1988, p. 413) had postulated that isolated tetravalent titanium ions in tetrahedral crystalline framework structure are the active sites in the TS-1 catalysts. FIG. 1 indicates that the majority of the titanium ions in MMATS are in an enviornment micro-structurally similar to that in TS-1 but in an amorphous silicate matrix lacking in long range order thereby leading to their unique ability to oxidise bulkier hydrocarbons. A crystalling matrix with a narrow uniform pore dimension like TS-1 would not be suitable in the oxidation of bulky hydrocarbons.

Accordingly, in the present invention there is provided a process for the preparation of amorphous micro-meso porous titanosilicates which comprises:

1. preparing a solution A of an alkoxide of titanium like titanium ethoxide or titanium isopropoxide or titanium butoxide, in an alkanol, such as ethanol or propanol or isopropanol or butanol or tertiary butanol by slowly adding the former to the latter.

2. preparing a solution B of an alkoxide of silicon namely, tetraethyl orthosilicates in an alkanol such as ethanol or propanol or isopropanol or butanol or tertiary butanol.

3. reacting solution A with solution B at a temperature below about 90° C. in the absence of a nitrogenated organic base such as tetramethyl ammonium hydroxide or tetra ethyl ammonium hydroxide or tetra butyl ammonium hydroxide and water to form a mixture C at a pH around 7.

4. adding water slowly to the above mentioned mixture C to form an transparent sol D, and 5. removing water from sol D by allowing it to age at a temperature below 90° C. to obtain the solid gel E and drying this gel at a temperature ranging from 90° to 120° C. and calcining at a temperature above 300° C. to form micro-meso porous amorphous titano silicate.

In one embodiment of the process of the present invention, the MMATS materials are prepared in the absence of nitrogenated organic bases like alkyl ammonium hydroxides such as tetramethyl ammonium hydroxide or tetraethyl ammonium hydroxide or tetrabutyl ammonium hydroxide or tetrapropyl ammonium hydroxide.

In another embodiment, the MMATS materials are prepared at a neutral pH value of around 7. It is particularly noteworthy that the prior art preparation of crystalline TS-1 teaches that both the utilisation of nitrogenated organic bases and a pH substantially above 7 and preferably above 10 during preparation, the said preparation process yielding a crystalline titanium silicate, are essential features of any titanium silicate catalyst used in the selective oxidation processes using $H_2O_2$ as the oxidising agent. Accordingly, one would hardly suspect that an amorphous titanosilicate prepared in the absence of the said nitrogenated organic bases and at a neutral pH of around 7 can be advantageously used in such selective oxidation reactions.

The MMATS materials of the present invention can be used for oxidising a hydrocarbon or its derivatives with an aqueous solution of $H_2O_2$. The concentration of $H_2O_2$ in the aqueous solution may vary between 5 and 30 wt %.

As alkoxides of titanium as well as those of silicon, the ethoxides, propoxides, butoxides or any of their combinations may be used. After removal of water from the gel, the material may be dried at a temperature above 100° C. and further calcined at a temperature between 300° and 600° C. to obtain the anhydrous form of MMATS.

The MMATS material of this invention has a BET (Brunaer, Emmett and Teller's multi layer absorption method) surface area of greater than 500 $m^2$ per gm, substantially higher than that of the prior art titanosilicates of both the amorphous and crystalline variety. The latter have surface area values around or below 400 $m^2$ per gm. The surface area of crystalline titanosilicates (TS-1) was found to be 408 $m^2$ per gm. A significant difference between MMATS and amorphous titanosilicates of the prior art is that while the latter are transformed into a mixture of crystalline $TiO_2$ anatase and $SiO_2$ on prolonged heating at around 800° C., the MMATS does not undergo any phase transformation under similar conditions indicating its much higher structural stability. Yet another important difference is that while the tetravalent titanium ions in prior art amorphous titanosilicates undergo reduction in hydrogen to the trivalent state, the tetravalent titanium ions in MMATS do not undergo any change in oxidation state even after prolonged reduction in hydrogen at temperature exceeding 500° C. An advantageous feature of the process of preparation of MMATS is that expensive material like nitrogenated organic bases, such as alkylammonium hydroxides namely, tetramethyl ammonium hydroxide or tetraethyl ammonium hydroxide or tetra propyl ammonium hydroxide or tetrabutyl ammonium hydroxide are not used during the process of preparation, thereby leading to a significant reduction in the cost of preparation compared to crystalline titanosilicates, like TS-1, whose preparation necessitates the use of such expensive nitrogenated organic bases. Some other advantages are listed here below:

1. The present preparation method leads to MMATS with high surface area (ranging from 400 to 700 $m^2/g$).

2. MMATS has bimodal pore size distribution and therefore accessible to bigger molecules also which is a credit application point of view.

3. Preparation method simpler than that of the TS-1 preparation method.

Some examples are given hereinafter in order to better illustrate the invention but without limiting it in any way.

EXAMPLE 1

An amorphous micro-meso porous material containing titanium and silicon as oxides was synthesised from the respective alkoxides using an alcohol and water. 7.5 gm of titanium (IV) isopropoxide was added to 250 ml of isopropyl alcohol under stirring to form a solution A. 93.4 gm of tetraethylorthosilicate was mixed with 50 ml of ethanol to which the solution A was added slowly under vigorous stirring at room temperature. 250 ml of deionised water was then added, while stirring continued. The mixture was kept at 50° C. for 36 hrs. to form a gel which was then dried at 110° C. for 24 hrs. This was further calcined at 450° C. for 12 hrs. The x-ray diffraction analysis established the product as being amorphous and the x-ray scattering data on calculation for the radial electron distribution showed the interatomic vectors to be similar to that shown in FIG. 1. The BET surface area was 600 $cm^2/g^{-1}$. The pore size distribution based on the total adsorption-desorption isotherm of the sample at liquid nitrogen temperature indicates the formation of micro pores below 10 Å and meso pores in the range of 40 Å pore width as shown in FIG. 2 of the drawings accompanying this specification.

The product composition of the sample is given $TiO_2$:16 $SiO_2$.

EXAMPLE 2

Another such amorphous MMATS sample was synthesised from titanium (IV) isorpoxide and tertiary butyl alcohol mixture. 3.74 gm of titanium isopropoxide was added to 250 ml of t-butyl alcohol under constant stirring to form a solution A. 93.4 gm of tetraethylorthosilicate was mixed with 50 ml of ethanol to which solution A was added slowly under vigorous stirring at room temperature. 250 ml of deionised water was then added while the temperature was raised to 65° C. and kept for 36 hrs. to form a gel which was then dried at 110° C. for 24 hrs. The sample was finally calcined at 500° C. for 12 hrs. The x-ray diffraction profile showed the sample to be amorphous and the interatomic vectors to be similar to that shown in FIG. 1. The BET surface area was 568 m$^2$/g. The pore size distribution was similar to that of sample described in Example 1 and consisted of both micro and meso pores.

The product composition of the sample is given TiO$_2$:32.5 SiO$_2$.

EXAMPLE 3

Another such amorphous MMATS sample was synthesised from titanium (IV) isorpoxide and tertiary butyl alcohol mixture. 2.49 gm of titanium isopropoxide was added to 250 ml of t-butyl alcohol under constant stirring to form a solution A. 93.4 gm of tetraethylorthosilicate was mixed with 50 ml of ethanol to which solution A was added slowly under vigorous stirring at room temperature. 250 ml of deionised water was then added while the temperature was raised to 65° C. and kept for 36 hrs to form a gel which was then dried at 110° C. for 24 hrs. The sample was finally calcined at 500° C. for 12 hrs. The x-ray diffraction profile showed the sample to be amorphous and the interatomic vectors to be similar to that shown in FIG. 1. The BET surface area was 559 m$^2$/g. The pore size distribution was similar to that of sample described in Example 1 and consisted of both micro and meso pores. The product composition of the sample is given by TiO$_2$:51 SiO$_2$.

We claim:

1. A process for the preparation of micro-meso porous amorphous titanium silicates having a molar composition in terms of the anhydrous oxides of TiO$_2$:(5–400) SiO$_2$, the said titanium silicates being further characterized by (a) the absence of any line in its x-ray diffraction pattern, (b) the presence of interatomic vectors around 1.6–1.7, 2.7–2.8, 4.1–4.2 and 5.0–5.2 Å in the radial electron density distribution, (c) an absorption band around 220 nm in the ultraviolet region, (d) an absorption band around 960 cm$^{-1}$ in the infrared region and (e) a bimodal pore size distribution with the first peak width maximum at a value less than 10 Å and the second peak width maximum between 10 and 100 Å, respectively, comprising the steps of:

(i) preparing a solution A of an alkoxide of titanium selected from the group consisting of titanium ethoxide, titanium isopropoxide, and titanium butoxide, in an alkanol, selected from the group consisting of ethanol, propanol, isopropanol, butanol and tertiary butanol by adding the former to the latter;

(ii) preparing a solution B of an alkoxide of silicon selected from the group consisting of tetraethyl orthosilicates in an alkanol selected from the group consisting of ethanol, propanol, isopropanol, butanol and tertiary butanol;

(iii) reacting solution A with solution B at a temperature below about 90° C. in the absence of a nitrogenated organic base selected from the group consisting of tetramethyl ammonium hydroxide, tetra ethyl ammonium hydroxide, and tetra butyl ammonium hydroxide, and water to form a mixture C at a pH around 7;

(iv) adding water to the above mentioned mixture C to form a transparent sol D; and (v) removing water from the sol D by allowing it to age at a temperature below 90° C. to obtain a solid gel E and drying this gel at a temperature ranging from 90° to 120° C. and calcining the dried gel at a temperature above 300° C. to form the micro-meso porous amorphous titanium silicate.

2. A process as claimed in claim 1 wherein the amorphous titanium silicate obtained in step (v) is calcined at a temperature between 300° and 600° C.

3. A process as claimed in claim 1 wherein the alkoxide of titanium used is selected from the group consisting of ethoxide, propoxide and butoxide.

4. A process as claimed in claim 2 wherein the alkoxide of silicon used is selected from the group consisting of ethoxide, isopropoxide and butoxide.

* * * * *